(12) United States Patent
Joo et al.

(10) Patent No.: US 6,934,403 B2
(45) Date of Patent: Aug. 23, 2005

(54) ROBUST BLIND WATERMARKING METHOD IN WAVELET DC COMPONENTS

(75) Inventors: Sanghyun Joo, Daejeon (KR); Yong-Seok Seo, Daejeon (KR); Young Ho Suh, Daejeon (KR); Weon Geun Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 769 days.

(21) Appl. No.: 10/029,835

(22) Filed: Dec. 31, 2001

(65) Prior Publication Data

US 2003/0099373 A1 May 29, 2003

(30) Foreign Application Priority Data

Nov. 27, 2001 (KR) ........................................ 2001-74151

(51) Int. Cl.[7] .................................................. G06K 9/00
(52) U.S. Cl. ...................................................... 382/100
(58) Field of Search ................................. 382/100, 232; 380/210, 252, 253, 287, 176, 180; 348/460; 386/94; 283/72, 74, 75; 399/366; 705/57, 58; 358/3.28

(56) References Cited

U.S. PATENT DOCUMENTS

| | | | | |
|---|---|---|---|---|
| 6,226,387 B1 | * | 5/2001 | Tewfik et al. ............... | 382/100 |
| 6,285,775 B1 | * | 9/2001 | Wu et al. .................... | 382/100 |
| 6,332,030 B1 | * | 12/2001 | Manjunath et al. ......... | 382/100 |
| 6,385,329 B1 | * | 5/2002 | Sharma et al. .............. | 382/100 |
| 6,415,042 B1 | * | 7/2002 | Shin ............................ | 382/100 |
| 6,556,689 B1 | * | 4/2003 | Xia et al. .................... | 382/100 |
| 6,687,824 B1 | * | 2/2004 | Shin ............................ | 713/176 |
| 6,694,040 B2 | * | 2/2004 | Hayashi et al. ............. | 382/100 |
| 6,728,409 B2 | * | 4/2004 | Inoue et al. ................. | 382/232 |
| 6,785,401 B2 | * | 8/2004 | Walker et al. .............. | 382/100 |
| 6,792,129 B1 | * | 9/2004 | Zeng et al. .................. | 382/100 |

OTHER PUBLICATIONS

Ikpyo Hong, Intaek Kim, and Seung-Soo Han, Division of Electrical and Information Control Engineering Myongji University, "A Blind Watermarking Technique Using Wavelet Transform" 2001 IEEE, ISIE 2001, Pusan, Korea, pp. 1946–1950.

* cited by examiner

*Primary Examiner*—Andrew W. Johns
*Assistant Examiner*—Shervin Nakhjavan
(74) *Attorney, Agent, or Firm*—Mayer, Brown, Rowe & Maw LLP

(57) ABSTRACT

An apparatus and method for embedding and extracting digital watermarks using a blind mode based on wavelet transform which is robust to external attacks while being capable of minimizing a degradation in picture quality caused by embedding of the watermarks. In accordance with the invention, watermarks protection of the copyright for desired data are embedded in DC component domains of wavelet-transformed domains. In accordance with the invention, embedding of watermarks in a target image corresponding to a target domain in which the watermarks are to be embedded, is achieved by generating a data stream of the watermarks in accordance with a key value selected by the user, generating index information representing positions where the watermarks are to be embedded, in accordance with a key value selected by the ser, and reflecting the watermark data stream on data values of pixels in the target image at the positions based on the index information.

37 Claims, 7 Drawing Sheets

ROBUST BLIND WATERMARKING METHOD IN WAVELET DC COMPONENTS

FIELD OF THE INVENTION

The present invention relates to digital watermarking based on wavelet transform, and more particularly to an apparatus and a method for embedding and extracting digital watermarks using a blind mode based on wavelet transform which is capable of extracting watermarks without using original data.

BACKGROUND OF THE INVENTION

Change from the analog age to the digital age is rapidly progressing, as apparent from generalization of digital media, great and wide growth of electronic publishing industries, digitalization of diverse multimedia contents, and rapid development of digital communication networks such as the Internet, all of which have been recently made. That is, rapid and easy transfer and exchange of diverse data associated with e-books, Internet TV, images, videos, MP3, etc. are currently enabled. Using such multimedia services, therefore, users can rapidly and easily obtain desired information.

However, the change to the digital age involves various adverse effects. For example, the development of digital techniques has allowed a large number of copies to be produced. Furthermore, the development of communication networks has allowed the distribution of copies without any limitation. For this reason, creative works of individuals may be unreasonably used by stealth. Practically, such adverse effects have been highlighted as significant problems to providers, who provide data services such as MP3 files or moving picture data over the Internet, which must be surely eliminated.

Accordingly, research has been performed to provide various copy prevention techniques for effectively preventing copying of digital data, thereby protecting the copyrights of the digital data. For example, research has been actively performed in association with a digital watermarking method, which is known to be effective for prevention of copying of digital data. Watermarking is a technique developed to prevent copying of digital contents. In accordance with this technique, the owner of a copyright can embed, in a multimedia content created by him, a specific stream of digital data representing information about the ownership of the multimedia content while being visually and audibly imperceptible. Such a specific digital data stream is called a "watermark".

This technique is very useful in that watermarks serve to easily determine whether or not digital data is under a copyright, while being visually and audibly imperceptible. For such a technique, various watermarking methods have been proposed which are mainly applied to DCT transform domains based on frequency domains.

For example, I. J. Cox has proposed a watermarking method in which the entire domain of an image is processed by DCT (Discrete Cosine Transform) without being divided into blocks so that random noise proportional to DCT coefficients are embedded, as watermark signals, in the domains, except for the low frequency domain. In addition, various watermarking methods based on DCT domains have been proposed. For example, a watermarking method based on block DCT has been proposed in which insertion of a watermark is determined based on a JND (Just Noticeable Difference) value using human visual characteristics. In accordance with this method, a product by the JND value is embedded as a watermark signal. Recently, a method has been proposed in which a visually-imperceptible watermark is embedded in a DC component of a DCT domain. Meanwhile, in pace with the recently increased demand for highly efficient compression of image and video data, research for compression of image data is actively conducted in association with image data compression using a wavelet transform, as compared to image data compression using a DCT, which involves a blocking phenomenon in the encoding of super-low-speed moving pictures. In particular, the watermarking methods based on DCT domains are ineffective in JPEG 2000, that is, a new image compression standard recently established for Internet environments, because compression of images is performed based on a wavelet transform in the JPEG 2000, different from the existing JPEG standards based on DCT.

Based on this background, research for watermarking methods based on wavelet transform, which are compatible with the JPEG 2000, is actively conducted.

Various watermarking methods based on the wavelet transform have been proposed. For example, there is a watermarking method in which watermark signals having different lengths are embedded in all high-frequency domains, except for the lowest-frequency domain, respectively. Also, a watermarking method has been proposed in which a watermark signal is embedded in a coefficient having a larger value. In most of the proposed methods, a watermark is embedded in frequency components, except for DC components, that is, the lowest-frequency components, after a frequency transform including a wavelet transform, taking into consideration the human visual characteristics more sensitive to a variation in low-frequency components than to a variation in high-frequency components. However, these methods still have problems in that the watermark is considerably damaged when the high-frequency components are eliminated in accordance with a compression process such as JPEG compression.

Furthermore, in fields where it is difficult to obtain original data such as media or moving pictures, for example, on the Internet, it is impossible to extract watermarks where there is no original data.

For this reason, it has been strongly required to provide a blind watermarking method based on wavelet transform which is capable of extracting watermarks without using original data, while enhancing a robustness of those watermarks to external attacks such as compression.

On the other hand, such a blind watermarking technique has been disclosed in an article "A Blind Watermarking Technique Using Wavelet Transform", "ISIE 2001, Pusan, Korea", pp 1946–1950, in 2000. This technique "A Blind Watermarking Technique Using Wavelet Transform", only proposes a method in which characteristics of an image are used as watermarks. In other words, this technique provides no means for embedding and extracting random watermarks desired by users. Furthermore, this technique cannot achieve embedding of diverse watermarks because the number of pixels usable for a watermark in an image corresponds to only 1/10 of a typical watermark length. In particular, this technique can provide no means for extracting watermark data without using original image data.

SUMMARY OF THE INVENTION

Therefore, an object of the invention is to provide an apparatus and method for embedding and extracting digital watermarks using a blind mode based on wavelet transform in which the watermarks are embedded in DC component domains of wavelet-transformed domains in the order of pixels having a higher high-frequency dependency, so that they are robust to external attacks such as compression while minimizing a degradation in picture quality caused by the embedding thereof.

In accordance with one aspect, the present invention provides a blind digital watermark embedding apparatus based on wavelet transform comprising: a high-frequency component removing unit for removing high-frequency components from a target image corresponding to a target domain of a wavelet-transformed original image in which watermarks are to be embedded, thereby generating a mirror image corresponding to the target domain free of high-frequency components; an index information generating unit for generating index information representing pixel positions in the target domain where data of the watermarks are to be embedded, respectively; a watermark generating unit for generating a data stream of the watermarks to be embedded in the target image; and a watermark embedding unit for embedding the watermarks of the watermark data stream generated from the watermark generating unit in pixel data of the target image at the pixel positions determined based on the index information from the index information generating unit, respectively.

In accordance with another aspect, the present invention provides a blind digital watermark extracting apparatus based on wavelet transform comprising: a high-frequency component removing unit for removing high-frequency components from a target image corresponding to a target domain of a wavelet-transformed original image in which watermarks are to be embedded, thereby generating a mirror image corresponding to the target domain free of high-frequency components; an index information generating unit for generating index information representing pixel positions in the target domain where data of the watermarks are to be embedded, respectively; a watermark generating unit for generating a data stream of the watermarks to be embedded in the target image; a watermark extracting unit for receiving the index information from the index information generating unit, receiving a watermark-embedded image corresponding to a watermark-embedded domain of the wavelet-transformed original image, and extracting a data stream of watermarks from in the watermark-embedded image, based on the index information; and a watermark comparing unit for checking a similarity between the original watermark data stream from the watermark generating unit and the extracted watermark data stream from the watermark extracting unit, thereby determining whether or not the original watermarks are embedded in the wavelet-transformed original image.

In accordance with another aspect, the present invention provides a digital watermark embedding method in a wavelet-based blind digital watermark embedding apparatus including a high frequency removing unit, an index information generating unit, a watermark generating unit, and a watermark embedding unit, comprising the steps of: (a) executing a multi-level wavelet transform at a level corresponding to the size of a data stream of watermarks to be embedded, for an original image in which the watermarks are to be embedded, and setting a target domain of the wavelet-transformed image in which the watermarks are to be embedded; (b) removing high-frequency components from a target image corresponding to the set target domain, thereby generating a mirror image corresponding to the target image, but free of high-frequency components; (c) generating index information representing pixel positions in the target domain where data of the watermarks are to be embedded, respectively; and (d) embedding the watermark data stream in pixel data of the target image at the pixel positions determined based on the index information, respectively.

In accordance with another aspect, the present invention provides a digital watermark extracting method in a wavelet-based blind digital watermark extracting apparatus including a high frequency removing unit, an index information generating unit, a watermark generating unit, a watermark extracting unit, and a watermark comparing unit, comprising the steps of: (a') generating position information about pixels in which a data stream of original watermarks has bee embedded, based on a target image corresponding to a target domain of a wavelet-transformed original image in which the original watermark data stream has been embedded; (b') receiving data of pixels in the target domain in which the original watermark data stream has been embedded; (c') extracting a watermark data stream from the received pixel data at positions determined based on the pixel position information; and (d') checking a similarity between the original watermark data stream and the extracted watermark data stream, thereby determining whether or not the original watermarks are embedded in the wavelet-transformed original image.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF THE PREFERRED EMBODIMENTS

Now, preferred embodiments of the present invention will be described with reference to the annexed drawings.

Figure 1:
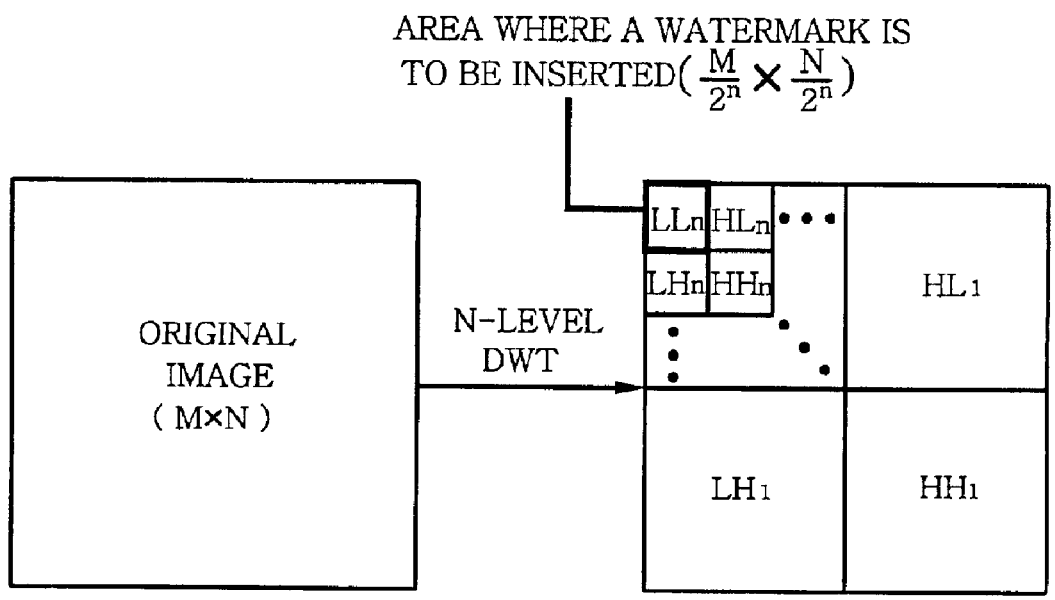
FIG. 1 is a concept diagram illustrating a procedure for setting a target domain in which watermarks are to be embedded, in accordance with an embodiment of the present invention.

FIG. 1 illustrates a wavelet transform procedure for embedding watermarks in an image in accordance with an embodiment of the present invention.

Where it is desired to embed watermarks in a particular image shown in FIG. 1 for protection of the copyright for the image, it is necessary to decompose the original image into wavelets in order to determine domains in which a watermark is to be embedded. That is, an n-level wavelet transform should be performed for the original image, as shown in FIG. 1. The level of wavelet transform determines the size of a DC domain in which a watermark is to be embedded. Accordingly, the wavelet transform level must be appropriately determined so that it prevents a degradation in picture quality caused by the embedding of the watermark. For example, when a DC domain has the same size as its original image, it can allow a maximum number of watermarks to be embedded therein. Generally, where an n-level wavelet transform for an image having M×N size is performed, a domain $LL_n$ may be determined as a target domain in which a watermark is to be embedded, as shown in FIG. 1 and expressed by Equation 1:

$$\text{size } (LL_n) = \frac{M}{2^n} \times \frac{N}{2^n} \qquad \text{Equation (1)}$$

The size of the target domain may be determined, taking into consideration the length and embedding strength of a watermark data stream to be embedded, and the level of a degradation in picture quality caused by the embedding of the watermark data stream.

Where the domain $LL_n$ is determined as a target domain in which a watermark is to be embedded, a procedure for removing high-frequency components from the target domain $LL_n$ should be executed. In this procedure, the high-frequency dependency of each pixel in the target domain $LL_n$ is checked in order to conduct the embedding of a watermark data stream in the pixels of the target domain $LL_n$ in the order of pixels having a higher high-frequency dependency. In accordance with this procedure, it is possible to prevent a degradation in picture quality caused by the embedding of watermarks. In the illustrated embodiment of the present invention, the original image is wavelet-transformed to estimate and detail domains. The watermark data stream is embedded in the estimate domain, which consists of DC components, for a desired robustness of the watermark data. Where the watermark data stream is randomly embedded in the pixels of wavelet-transformed DC component domain, a severe degradation in picture quality may occur. In order to minimize a degradation in picture quality caused by the embedding of watermark data, therefore, the watermark data is preferentially embedded in those of the pixels of the DC component domain exhibiting a higher high-frequency dependency, in accordance with the present invention, taking into the consideration the fact that the visual characteristics of humans are more sensitive to a variation in low-frequency components than to a-variation in high-frequency components.

Figure 2:
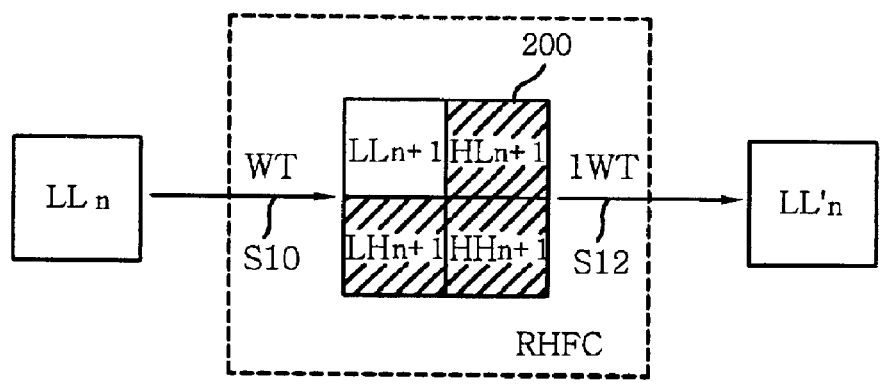
FIG. 2 is a concept diagram illustrating a procedure for removing high-frequency components from the target domain.

FIG. 2 is a concept diagram illustrating the procedure for removing high-frequency components from the target domain $LL_n$. This high-frequency component removing procedure will now be described with reference to FIG. 2.

Referring to FIG. 2, a 1-level wavelet transform is executed for the domain $LL_n$ determined as a target domain in which watermarks are to be embedded (Step S10). That is, the image of the target domain $LL_n$ is divided into a DC component domain $LL_{n+1}$ having estimate components, and high-frequency component domains $LH_{n+1}$, $HL_{n+1}$, and $HH_{n+1}$ each having detail components, as shown by a block 200 in FIG. 2. Subsequently, high-frequency components are removed from the high-frequency component domains other than the DC component domain. An inverse wavelet transform is executed for the block 200 (Step S12). The block 200 is a target domain, which has been processed by the 1-level wavelet transform while being in a high-frequency component removed state, and in which watermarks are to be embedded. In accordance with the inverse wavelet transform, a new domain $LL_n'$ free of high-frequency components is produced.

Figure 3:
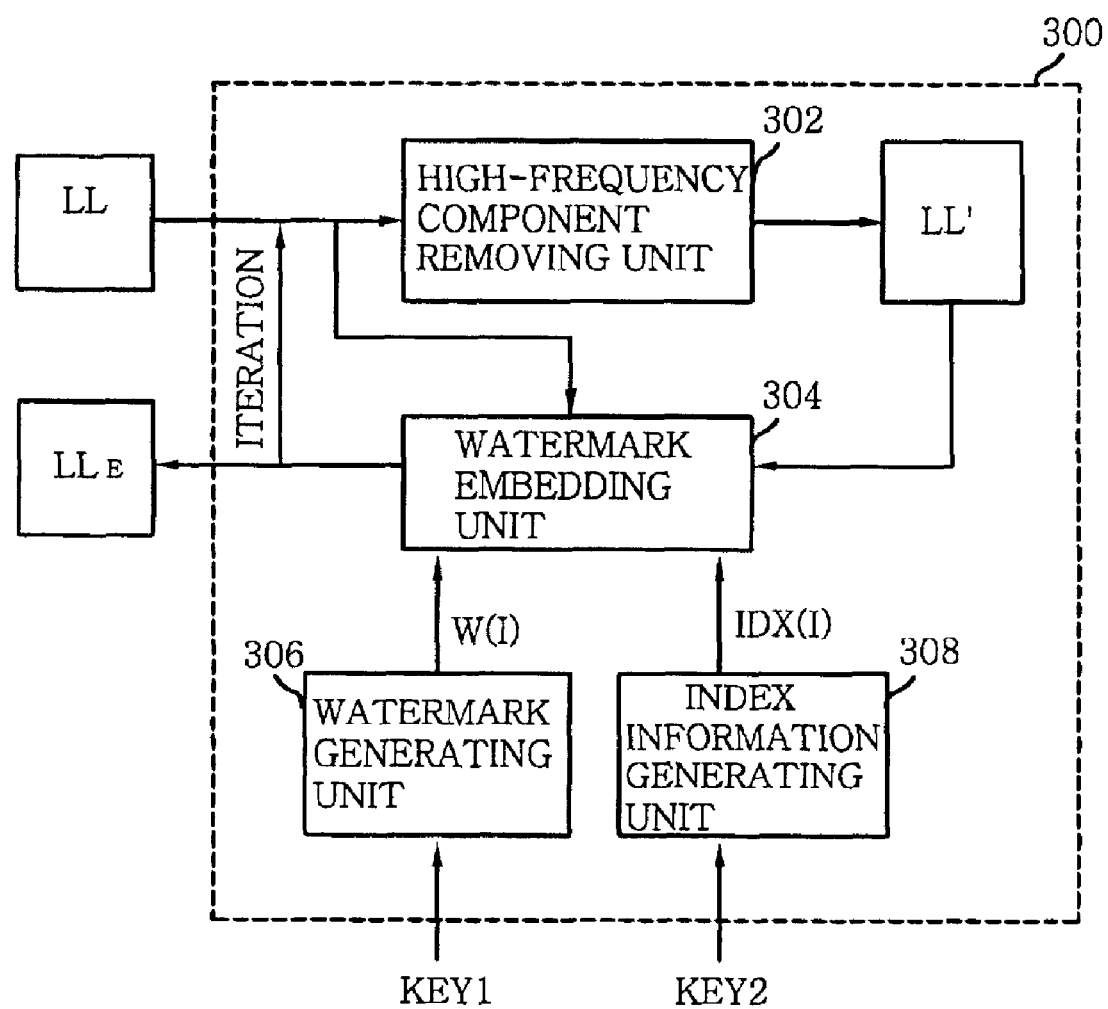
FIG. 3 is a block diagram illustrating an apparatus for embedding digital watermarks based on wavelet transform in accordance with an embodiment of the present invention.

FIG. 3 is a block diagram illustrating an apparatus for embedding digital watermarks using a blind mode based on wavelet transform in accordance with an embodiment of the present invention. In FIG. 3, the apparatus is denoted by the reference numeral 300. Now, the blind digital watermark embedding operation of the apparatus 300 will be described with reference to FIG. 3.

In response to inputting of a target image LL corresponding to a target domain, which has been processed by a wavelet transform according to the size of watermarks to be embedded, and in which the watermarks are to be embedded, a high-frequency component removing unit 302 included in the apparatus 300 conducts a 1-level wavelet transform for the target image LL so as to wavelet-transform again the target image LL. Thus, the target image LL is divided into an estimate domain, that is, a DC component domain, and detail domains. Subsequently, the high-frequency component removing unit 302 replaces, with a value of "0", the values of high-frequency components in the detail domains of the target image LL, except for the DC component domain, thereby removing those high-frequency components. The high-frequency component removing unit 302 then performs an inverse wavelet transform for the target image LL, thereby outputting a mirror image LL' corresponding to the target image LL, but free of the high-frequency components.

The mirror image LL' is inputted, along with the target image LL, to a watermark embedding unit 304. The watermark embedding unit 304 also receives index information idx(i) about positions, at which watermarks are to be embedded in the target domain, and a watermark data stream w(i). The index information idx(i) is generated by an index information generating unit 308 in accordance with a key value Key2 selected by the user, whereas the watermark data stream w(i) is generated by a watermark generating unit 306 in accordance with a key value Key1 selected by the user. The index information idx(i) is a random sequence randomly set based on a key value selected by the user. This random sequence is a binary sequence of "0" and "1". The stream length of the binary sequence corresponds to the size of a target domain in which watermarks are to be embedded. In this case, the number of "1" values in the binary sequence is equal to the number of watermarks in the watermark data stream. That is, watermarks are embedded at positions each corresponding to the value of "1", respectively. The watermark data stream w(i) is a random sequence of "1" and "−1" randomly set in accordance with a key selected by the user.

The watermark embedding unit 304 carries out a watermarking operation by embedding the watermark data in the pixel data of the target image LL at positions determined based on the index information idx(i).

Figure 4:
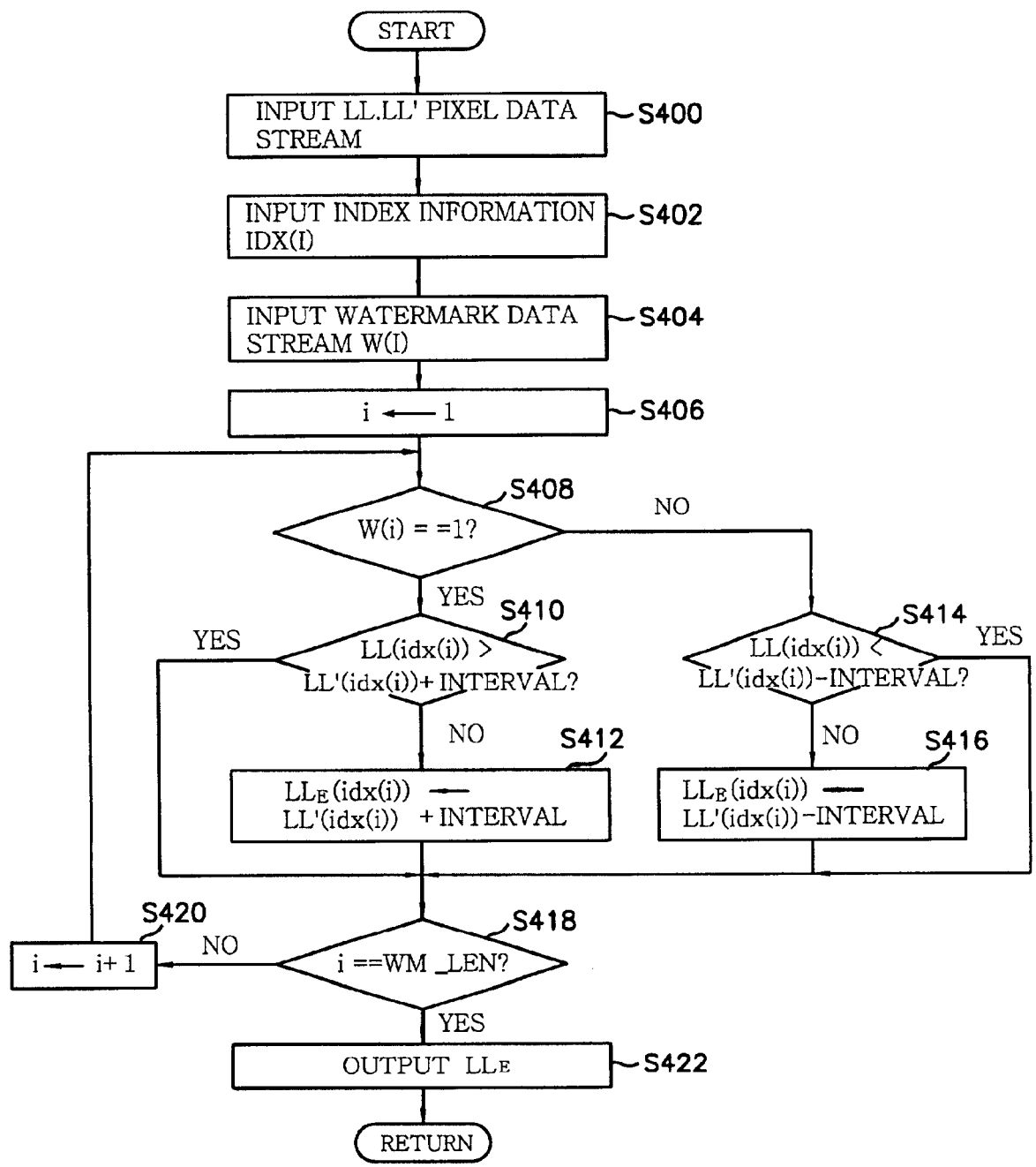
FIG. 4 is a flow chart illustrating a procedure for embedding watermarks using a blind mode based on wavelet transform in accordance with an embodiment of the present invention.

FIG. 4 illustrates a watermark embedding procedure carried out by the watermark embedding unit 304 in accordance with an embodiment of the present invention. With reference to FIG. 4, the watermark embedding operation of the watermark embedding unit 304 will be described.

At step S400 of FIG. 4, the watermark embedding unit 304 first receives the pixel data stream of a target image LL corresponding to the target domain in which watermarks are to be embedded, along with the pixel data stream of a mirror image LL' corresponding to the target image LL, but free of high-frequency components. As mentioned above, the mirror image LL' is generated from the high-frequency component removing unit 302. At steps S402 and S404, the watermark embedding unit 304 also receives index information idx(i) from the index information generating unit 308, and a watermark data stream w(i) from the watermark generating unit 306, respectively.

In response to the basic information for the embedding of watermarks, the watermark embedding unit 304 proceeds to step S406. At step S406, the watermark embedding unit 304 initially sets the value of "i" in the watermark data stream w(i) to "1". Thereafter, the watermark embedding unit 304 checks, at step S408, whether or not the data value of the watermark data stream w(i) corresponds to "1". Where the data value of the watermark data stream w(i) corresponds to "1", the watermark embedding unit 304 proceeds to step S410, at which it is determined whether or not the data value of a pixel in the target image LL at a position where the watermark data value is to be embedded, LL(idx(i)), is higher than a pixel data value obtained by adding a predetermined interval factor INTERVAL to the pixel data value LL'(idx(i)) of the mirror image LL' at the same position. The predetermined interval factor is a value for maintaining a desired difference or interval between the pixel data value LL(idx(i)) of the target image LL and the pixel data value LL'(idx(i)) of the mirror image LL' at the same position in order to easily distinguish the pixel data values LL(idx(i)) and LL'(idx(i)) from each other. The predetermined interval factor is set to be high enough to provide a sufficient interval between the two pixel data values, taking into consideration the fact that those pixel data values may be varied due to external attacks. However, a degradation in picture quality may occur when the predetermined interval factor is set to be too high. Accordingly, it is preferred that the predetermined interval factor be set to an appropriate value capable of preventing a degradation in picture quality.

Where the pixel data value LL(idx(i)) of the target image LL is higher than the pixel data value obtained by adding the predetermined interval factor INTERVAL to the pixel data value LL'(idx(i)) of the mirror image LL' at the same position, that is, there is a sufficient interval between the pixel data value LL(idx(i)) of the target image LL and the pixel data value LL'(idx(i)) of the mirror image LL' at the same position, the watermark embedding unit 304 proceeds to step S418 while maintaining the pixel data value LL(idx(i)) of the target image LL. On the other hand, when the pixel data value LL(idx(i)) of the target image LL is not higher than the pixel data value obtained by adding the predetermined interval factor INTERVAL to the pixel data value LL'(idx(i)) of the mirror image LL' at the same position, that is, there is an insufficient interval between the pixel data value LL(idx(i)) of the target image LL and the pixel data value LL'(idx(i)) of the mirror image LL' at the same position, the watermark embedding unit 304 proceeds to step S412. At step S412, the watermark embedding unit 304 replaces the pixel data value LL(idx(i)) of the target image LL with the pixel data value obtained by adding the predetermined interval factor INTERVAL to the pixel data value LL'(idx(i)) of the mirror image LL' at the same position. Accordingly, the watermarking operation is conducted under the condition in which there is a difference between the pixel data value LL(idx(i)) of the target image LL and the pixel data value LL'(idx(i)) of the mirror image LL' corresponding to the predetermined interval factor INTERVAL.

On the other hand, where it is determined at step S408 that the data value of the watermark data stream w(i) corresponds to "0", the watermark embedding unit 304 proceeds to step S414, at which it is determined whether or not the pixel data value LL(idx(i)) of the target image LL is lower than the pixel data value obtained by deducting the predetermined interval factor INTERVAL from the pixel data value LL'(idx(i)) of the mirror image LL' at the same position.

Where the pixel data value LL(idx(i)) of the target image LL is lower than the pixel data value obtained by deducting the predetermined interval factor INTERVAL from the pixel data value LL'(idx(i)) of the mirror image LL' at the same position, that is, there is a sufficient interval between the pixel data value LL(idx(i)) of the target image LL and the pixel data value LL'(idx(i)) of the mirror image LL' at the same position, the watermark embedding unit 304 proceeds to step S418 while maintaining the pixel data value LL(idx(i)) of the target image LL. On the other hand, when the pixel data value LL(idx(i)) of the target image LL is not lower than the pixel data value obtained by deducting the predetermined interval factor INTERVAL from the pixel data value LL'(idx(i)) of the mirror image LL' at the same position, that is, there is an insufficient interval between the pixel data value LL(idx(i)) of the target image LL and the pixel data value LL'(idx(i)) of the mirror image LL' at the same position, the watermark embedding unit 304 proceeds to step S416. At step S416, the watermark embedding unit 304 replaces the pixel data value LL(idx(i)) of the target image LL with the pixel data value obtained by deducting the predetermined interval factor INTERVAL from the pixel data value LL'(idx(i)) of the mirror image LL' at the same position. Accordingly, the watermarking operation is conducted under the condition in which there is a difference between the pixel data value LL (idx(i)) of the target image LL and the pixel data value LL'(idx(i)) of the mirror image LL' corresponding to the predetermined interval factor INTERVAL.

As described above, although the predetermined interval factor is set to be high enough to provide a sufficient interval between the two pixel data values, taking into consideration the fact that those pixel data values may be varied due to external attacks, a degradation in picture quality may occur when the predetermined interval factor is set to be too high. Accordingly, it is preferred that the predetermined interval factor be set to an appropriate value capable of preventing a degradation in picture quality.

Thereafter, the watermark embedding unit 304 proceeds to step S418, at which it is determined whether or not the "i" value of the watermark data stream w(i) is equal to the length WM_LEN of the watermark data stream, that is, whether or not the watermark data stream has been completely embedded. When it is determined that the "i" value of the watermark data stream w(i) is less than the length WM_LEN of the watermark data stream, that is, the embedding of the watermark data stream is not completed yet, the watermark embedding unit 304 proceeds from step S418 to step S420 in order to increment the "i" value by one. After the increment of the "i" value, the watermark embedding unit 304 performs its watermark data stream embedding operation while executing again steps S408 to S418. On the other hand, where the "i" value of the watermark data stream w(i) is equal to the length WM_LEN of the watermark data stream, that is, the embedding of the watermark data stream is completed, the watermark embedding unit 304 proceeds from step S418 to step S420. At step S420, the watermark embedding unit 304 outputs a new image $LL_E$ in which the watermark data stream w(i) is completely embedded.

Meanwhile, it is impossible to perfectly extract the watermark data stream embedded in the watermark-embedded image $LL_E$ produced by the procedure of FIG. 4, that is, an image produced through an once-performed watermark embedding procedure. This is because the pixel data values of the target image LL are varied after the embedding of the watermarks due to the embedded watermarks, and the pixel data values of the mirror image LL', which is an image obtained after removing high-frequency components from the target image LL, are also varied. Accordingly, it is necessary to iteratively perform the watermark embedding operation for the same watermark and the same watermark embedding position until the associated pixel data value of the target image LL is varied no longer due to the watermark embedded therein. To this end, the new watermark-embedded image $LL_E$ outputted from the watermark embedding unit 304 is fed back to the high-frequency component removing unit 302.

Figure 5:
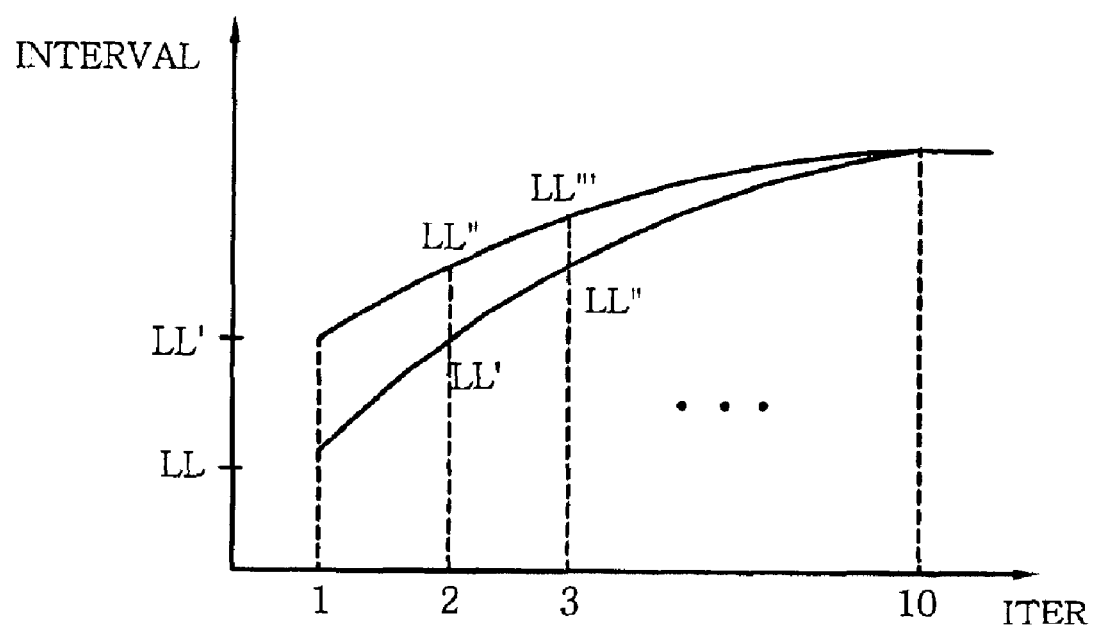
FIG. 5 is a graph depicting results of an experiment conducted for the interval between a target image and a watermark-embedded image produced after iterative execution of the watermark embedding operation.

FIG. 5 is a graph depicting results of an experiment conducted for the interval between the target image and a watermark-embedded image produced after iterative execution of the watermark embedding operation. Referring to FIG. 5, it can be seen that where the watermark embedding operation is iteratively executed for an iteration of typically 10 times, the interval between the target image and the watermark-embedded image produced by the watermark embedding operation is uniform without any variation, so that the watermark-embedded image has characteristics robust to diverse signal processing attacks.

Figure 6:
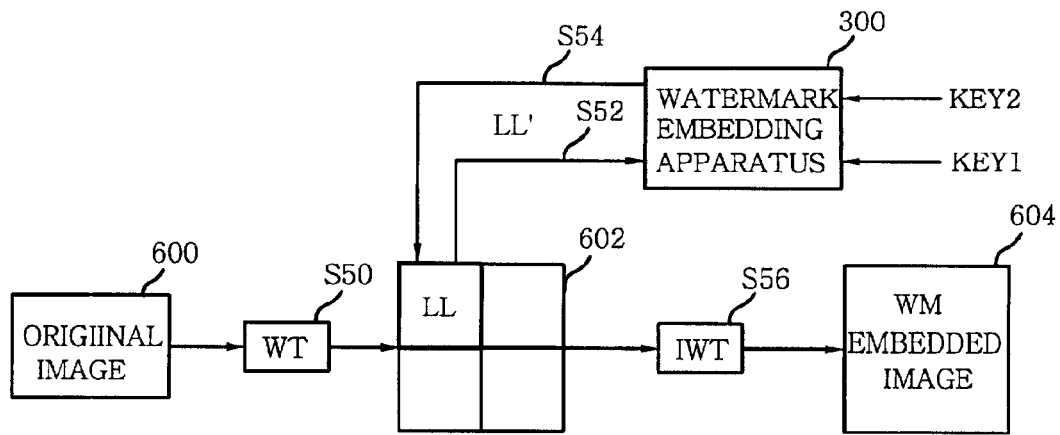
FIG. 6 is a concept diagram illustrating a procedure for embedding watermarks using a blind mode based on wavelet transform in accordance with an embodiment of the present invention.

FIG. 6 illustrates a blind watermark embedding procedure based on wavelet transform in accordance with an embodiment of the present invention. With reference to FIG. 6, the operation of producing a watermark-embedded image from an original image using a blind mode will be described.

Where there is a particular original image 600 in which watermarks are to be embedded, an appropriate wavelet transform level is determined in accordance with the size of the watermarks to be embedded (Step S50). At step S50, a wavelet transform is then performed for the original image 600 at the determined level. The wavelet transform level is appropriately determined to prevent the original image 600 from being degraded in picture quality due to the embedding of watermarks therein. Thereafter, a target image LL is applied to the watermark embedding apparatus 300 (Step S52). This target image LL corresponds to a target domain, which is included in the wavelet-transformed image and in which watermarks are to be embedded.

The watermark embedding apparatus 300 processes the target image LL to remove high-frequency components therefrom, thereby producing a mirror image LL' free of the high-frequency components.

The watermark embedding apparatus 300 then conducts embedding of watermarks by reflecting a watermark data stream w(i), that is, random sequence data produced in accordance with a key value Key1 selected by the user, on data values of pixels in the target image LL at positions based on index information idx(i), that is, position information about those pixels in which watermarks are to be embedded, produced in the form of a binary sequence in accordance with a key value Key2 selected by the user (Step S54). In order to achieve the embedding of the watermarks by reflecting the watermark data stream w(i) on the data values of the associated pixels, the pixel data value of the target image LL at each position where a watermark is to be embedded is compared with the pixel data value of the mirror image LL' at the same position. Where the data value of the watermark to be embedded corresponds to a value of "1", an addition of a predetermined interval factor value is performed, based on the result of the comparison, in order to set the pixel data value of the target image LL to be higher than the pixel data value of the mirror image LL' at the same position. On the other hand, where the data value of the watermark to be embedded corresponds to a value of "−1", a deduction of a predetermined interval factor value is performed, based on the result of the comparison, in order to set the pixel data value of the target image LL to be lower than the pixel data value of the mirror image LL' at the same position.

The resultant image 602 including the watermark-embedded image LL" is subjected to an inverse wavelet transform (Step S56). As a result, a watermark-embedded image 604 is produced. Since watermarks are sequentially embedded in pixels of the target domain at positions based on the binary sequence index information idx(i) produced using the key value Key2 selected by the user, in accordance with the present invention, it is possible to extract the watermarks-based on information about the watermark-embedded positions, that is, the binary sequence index information idx(i), in so far as the key value Key2 used for the embedding of the watermarks is known.

Figure 7:
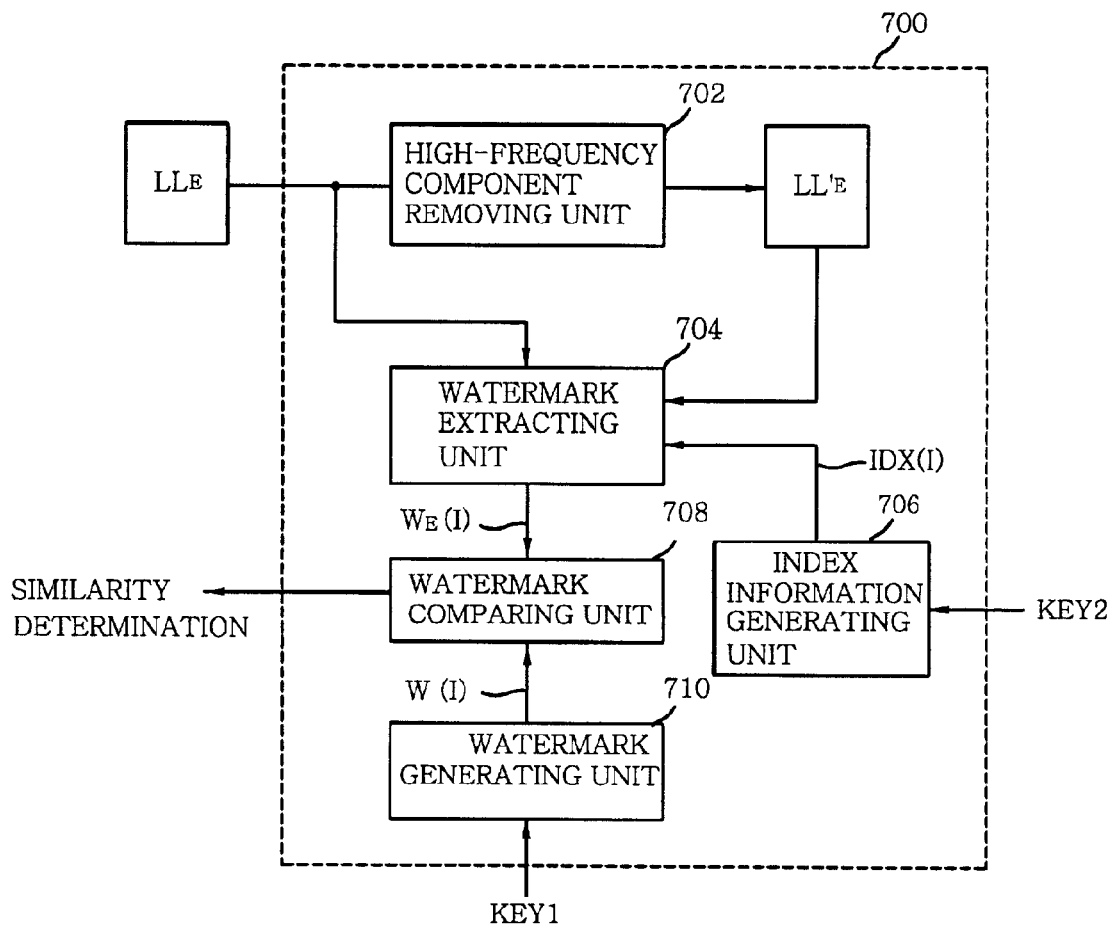
FIG. 7 is a block diagram illustrating an apparatus for extracting digital watermarks based on wavelet transform in accordance with an embodiment of the present invention

FIG. 7 is a block diagram illustrating an apparatus for extracting digital watermarks based on wavelet transform in accordance with an embodiment of the present invention. The operation of the digital watermark extracting apparatus will be described with reference to FIG. 7. In order to extract watermarks from a watermark-embedded image, a wavelet transform of the same level as that in the watermark embedding procedure, by which the watermark-embedded image is produced, is performed. In accordance with the wavelet transform, a watermark-embedded domain is separated from the watermark-embedded image, so as to extract watermarks from the watermark-embedded domain, that is, a target image $LL_E$. In order to achieve the extraction of the watermarks from the watermark-embedded image without using an original image, this case, it is necessary to use index information idx(i) informing of the positions of the watermarks embedded in the target image. This index information idx(i) can be easily produced, using the same key value as that used to produce index information in the watermark embedding procedure, that is, the key value Key2. Accordingly, it is possible to extract the watermarks from the watermark-embedded image, based on the produced index information idx(i), without using the original image.

That is, the watermark extracting apparatus, which is denoted by the reference numeral 700, first produces a mirror image $LL_E'$ by removing high-frequency components from a target image $LL_E$ corresponding to a watermark-embedded domain, through a high-frequency component removing unit 702. Thereafter, index information idx(i) informing of the positions of watermarks embedded in the target image $LL_E$, using the same key value as that used to produce index information in the watermark embedding procedure for producing the target image $LL_E$, that is, the key value Key2. The pixel data value of the target image $LL_E$ at each watermark-embedded position determined based on the index information idx(i) is compared with the pixel data value of the mirror image $LL_E'$ at the same position. Based on the results of the comparison, the watermarks embedded in the target image $LL_E$ are extracted.

A data stream of the extracted watermarks, $w_E'(i)$, is applied to a watermark comparing unit 708. The watermark comparing unit 708 compares the extracted watermark data stream $w'(i)$ with a watermark data stream $w(i)$ produced using the same key value as that used in the watermark embedding procedure, that is, the key value Key1, in terms of similarity, thereby determining whether or not there are watermarks in the target image. The determination of whether or not there are watermarks in the target image is achieved by computing a correlation value between the extracted watermark data stream $w_E(i)$ and the original watermark data stream $w(i)$, thereby measuring a normalized similarity Sim, as expressed by Equation 2:

$$Sim(w, w_E') = \frac{\sum_{i=1}^{WM\ Length} w(i) \cdot w_E'(i)}{\sum_{i=1}^{WM\ Length} w_E'(i) \cdot w_E'(i)} \quad \text{Equation (2)}$$

Where the value of similarity, Sim, corresponds to a high value, the two watermark data streams are determined to be signals having a high correlation. That is, the two watermark data streams in this case are determined to be identical to each other. On the other hand, where the value of similarity, Sim, corresponds to a value of "0", the two watermark data streams are determined to be signals having no correlation. That is, the two watermark data streams in this case are determined to be different from each other. In the latter case, it is determined that no watermark is embedded in the target image.

Figure 8:
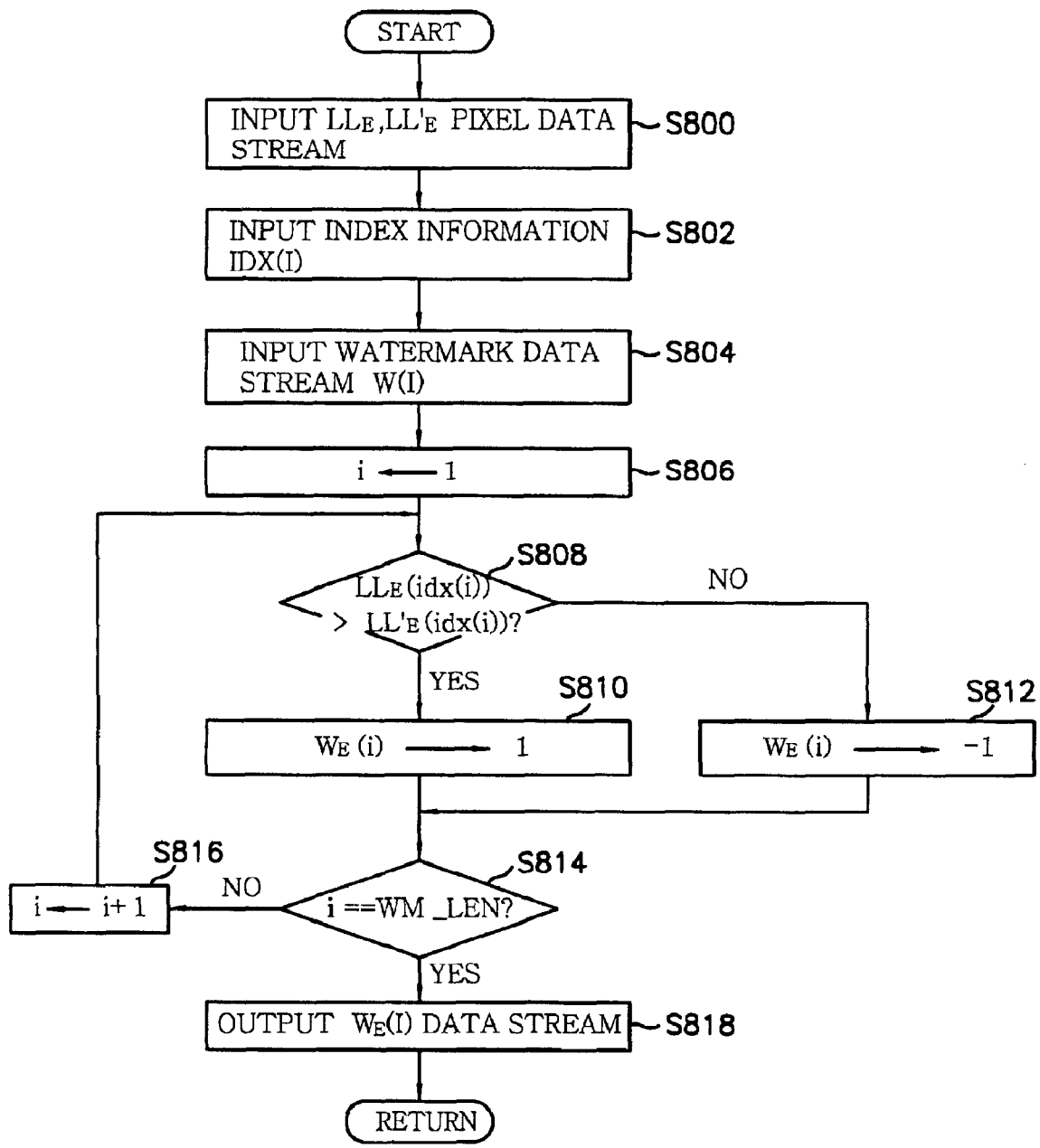
FIG. 8 is a flow chart illustrating a procedure for extracting digital watermarks using a blind mode based on wavelet transform in accordance with an embodiment of the present invention.

FIG. 8 illustrates a watermark extracting procedure performed by the watermark extracting unit 704 in accordance with an embodiment of the present invention. Now, the watermark extracting procedure will be described in detail with reference to FIG. 8.

At step S800 of FIG. 8, the watermark extracting unit 704 first receives the pixel data stream of a target image $LL_E$ corresponding to the watermark-embedded domain of a watermark-embedded image, along with the pixel data stream of a mirror image $LL_E'$ corresponding to the target image $LL_E$, but free of high-frequency components. As described above, the mirror image $LL_E'$ is generated from the high-frequency component removing unit 702. At steps S802 and S804, the watermark extracting unit 704 also receives index information idx(i) from the index information generating unit 706, and a watermark data stream $w(i)$ from the watermark generating unit 710, respectively.

In response to the basic information for the extraction of watermarks, the watermark extracting unit 704 proceeds to step S806. At step S806, the watermark extracting unit 804 initially sets the value of "i" in the watermark data stream w(i) to "1". Thereafter, the watermark extracting unit 804 checks, at step S808, whether or not the data value of a pixel in the target image $LL_E$ at a position where the watermark data of the watermark data stream w(i) corresponding to the "i" value of "1", that is, the first watermark data, is embedded is higher than the pixel data value of the mirror image $LL_E'$ at the same position. When the pixel data value of the target image $LL_E$ is higher than the pixel data value of the mirror image $LL_E'$ at the same position, the watermark extracting unit 704 proceeds to step S810, and determines the watermark data embedded at the pixel position to have a data value of "1". On the other hand, when the pixel data value of the target image $LL_E$ is not higher than the pixel data value of the mirror image $LL_E'$ at the same position, the watermark extracting unit 704 proceeds from step S808 to step S812, and determines the watermark data embedded at the pixel position to have a data value of "−1".

The watermark extracting unit 704 then proceeds to step S814, at which it is determined whether or not the "i" value of the watermark data stream w(i) is equal to the length WM_LEN of the watermark data stream, that is, whether or not all watermark data have been completely extracted. When it is determined that the "i" value of the watermark data stream w(i) is less than the length WM_LEN of the watermark data stream, that is, the extraction of the watermark data stream $w_E(i)$ is not completed yet, the watermark extracting unit 704 proceeds from step S814 to step S816 in order to increment the "i" value by one. After the increment of the "i" value, the watermark extracting unit 704 performs its operation for extracting the watermark data stream $w_E(i)$ while executing again steps S808 to S814.

On the other hand, where the "i" value of the watermark data stream w(i) is equal to the length WM_LEN of the watermark data stream, that is, the extraction of the watermark data stream $w_E(i)$ is completed, the watermark extracting unit 704 proceeds from step S814 to step S818. At step S818, the watermark extracting unit 704 outputs the extracted watermark data stream $w_E(i)$.

Figure 9:
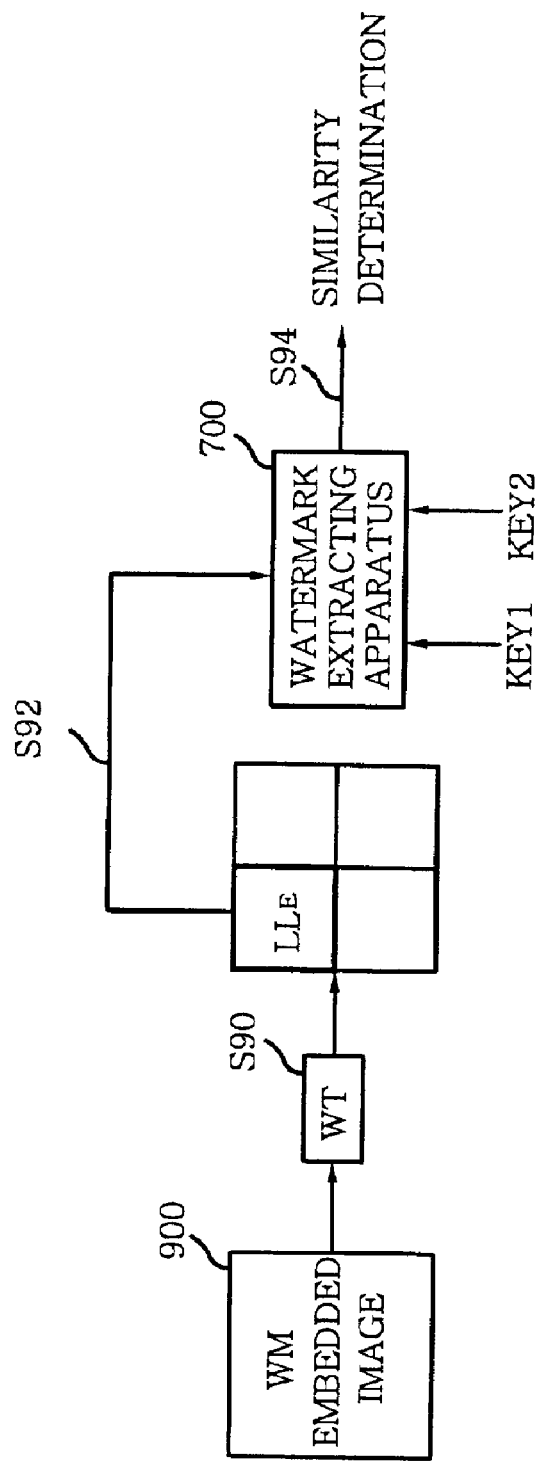
FIG. 9 is a concept diagram illustrating a procedure for extracting watermarks using a blind mode based on wavelet transform in accordance with an embodiment of the present invention.

FIG. 9 illustrates a blind watermark extracting procedure based on wavelet transform in accordance with an embodiment of the present invention. Now, the procedure of extracting watermarks from a watermark-embedded image using a blind mode will be described with reference to FIG. 9.

In order to extract watermarks from a watermark-embedded image 900, a wavelet transform of the same level as that in the watermark embedding procedure, by which the watermark-embedded image is produced, is performed (Step S90). In accordance with the wavelet transform, a watermark-embedded domain is separated from the watermark-embedded image 900, thereby obtaining a target image $LL_E$ corresponding to the separated watermark-embedded domain. The target image $LL_E$ is inputted to the watermark extracting apparatus 700 (Step S92). Thereafter, the watermark extracting apparatus 700 extracts a data stream of watermarks, $w_E(i)$, embedded in pixels of the target image $LL_E$ at positions determined based on the index information setting key value Key2 used in the watermark embedding procedure. The watermark extracting apparatus 700 then performs a similarity checking operation by comparing the extracted watermark data stream $w_E(i)$ with an original watermark data stream w(i) generated using the watermark data stream setting key value Key1 used in the watermark embedding procedure, thereby determining whether or not there are watermarks in the target image (Step S94).

Accordingly, even when there is no original image data, it is possible to easily extract watermark data using the watermark data stream setting key value Key1 and index information setting key value Key2 used in the watermark embedding procedure.

Although the preferred embodiments of the invention have been disclosed for illustrative purposes, those skilled in the art will appreciate that various modifications, additions and substitutions are possible, without departing from the scope and spirit of the invention as disclosed in the accompanying claims. For example, although procedures of embedding watermarks in a DC component domain using a blind mode based on wavelet transform, and extracting those watermarks have been described in conjunction with the preferred embodiments of the present invention associated with images, the present invention may be equivalently applied to audio, video, and text images. Therefore, the scope of the invention should be defined by the claims without being defined by the illustrated embodiments.

As apparent from the above description, the present invention provides an apparatus and method for embedding and extracting digital watermarks based on wavelet transform in which watermarks protection of the copyright for desired data, are embedded in DC component domains of wavelet-transformed domains. Accordingly, the embedded watermarks can be robust to external attacks such as compression. In accordance with the present invention, embedding of watermarks in a target image corresponding to a target domain in which the watermarks are to be embedded, is achieved by generating a data stream of the watermarks in accordance with a key value selected by the user, generating index information representing positions where the watermarks are to be embedded, in accordance with a key value selected by the ser, and reflecting the watermark data stream on data values of pixels in the target image at the positions based on the index information. Accordingly, there is an advantage in that the index information about the watermark-embedded positions can be easily obtained using the index information setting key value, so that the watermarks can be extracted even when there is no original image data.

What is claimed is:

1. A blind digital watermark embedding apparatus based on wavelet transform comprising:

a high-frequency component removing unit for removing high-frequency components from a target image corresponding to a target domain of a wavelet-transformed original image in which watermarks are to be embedded, thereby generating a mirror image corresponding to the target domain free of high-frequency components;

an index information generating unit for generating index information representing pixel positions in the target domain where data of the watermarks are to be embedded, respectively;

a watermark generating unit for generating a data stream of the watermarks to be embedded in the target image; and a watermark embedding unit for embedding the watermarks of the watermark data stream generated from the watermark generating unit in pixel data of the target image at the pixel positions determined based on the index information from the index information generating unit, respectively.

2. The blind digital watermark embedding apparatus based on wavelet transform according to claim 1, wherein the high-frequency component removing unit generates the mirror image by performing again a 1-level wavelet transform for the target domain of the wavelet-transformed original image, removing high-frequency components from detail domains of the wavelet-transformed target domain, except for an estimate component domain of the wavelet-transformed target domain, and performing an inverse wavelet transform for the resultant target domain.

3. The blind digital watermark embedding apparatus based on wavelet transform according to claim 2, wherein the high-frequency component removing unit removes high-frequency components from the target image by replacing, with a value of "0", values of the high-frequency components in the detail domains of the wavelet-transformed target domain.

4. The digital watermark embedding apparatus based on wavelet transform according to claim 1, wherein the index information generating unit generates, as the index information, a binary sequence data stream randomly set in accordance with an index information setting key value selected by a user while having the same size as the target domain.

5. The blind digital watermark embedding apparatus based on wavelet transform according to claim 1, wherein the target domain corresponds to a DC component domain obtained from the original image subjected to a wavelet transform at a level determined by a length and embedding strength of the watermark data stream to be embedded, and the level of a degradation in picture quality caused by the embedding of the watermark data stream.

6. The blind digital watermark embedding apparatus based on wavelet transform according to claim 1, wherein the watermark data stream is random data of "1" and "−1" randomly set in accordance with a watermark data stream setting key selected by a user.

7. The blind digital watermark embedding apparatus based on wavelet transform according to claim 1, wherein when the data value of an watermark in the watermark data stream to be embedded corresponds to a value of "1", the pixel data value of the target image at a position where the watermark is to be embedded is set to be higher than the pixel data value of the mirror image at the same position.

8. The blind digital watermark embedding apparatus based on wavelet transform according to claim 7, wherein when the watermark data value corresponds to "1", the watermark is embedded in the target image by replacing the pixel data value of the target image with the pixel data value obtained by adding a predetermined interval factor to the pixel data value of the mirror image at the same position, as expressed by the following equation, so that a desired interval is maintained between the pixel data value of the target image and the pixel data value of the mirror image.

$$LL_E(idx(i)) = LL'(idx(i)) + \text{INTERVAL}$$

where, idx(i): the index information representing the position of the target domain where the watermark is to be embedded;

LL': the pixel data stream of the mirror image corresponding to the target image, but free of high-frequency components; and $LL_E$: the pixel data stream of a wavelet-transformed DC component domain in which the watermark has been embedded.

9. The blind digital watermark embedding apparatus based on wavelet transform according to claim 8, wherein the predetermined interval factor value is set to a maximum interval between the pixel data values of the target and mirror images capable of preventing a degradation in picture quality.

10. The blind digital watermark embedding apparatus based on wavelet transform according to claim 1, wherein when the data value of an watermark in the watermark data stream to be embedded corresponds to a value of "−1", the pixel data value of the target image at a position where the watermark is to be embedded is set to be lower than the pixel data value of the mirror image at the same position.

11. The blind digital watermark embedding apparatus based on wavelet transform according to claim 10, wherein when the watermark data value corresponds to "−1", the watermark is embedded in the target image by replacing the pixel data value of the target image with the pixel data value obtained by deducting a predetermined interval factor to the pixel data value of the mirror image at the same position, as expressed by the following equation, so that a desired interval is maintained between the pixel data value of the target image and the pixel data value of the mirror image.

$$LL_E(idx(i))=LL'(idx(i))-\text{INTERVAL}$$

where,
idx(i): the index information representing the position of the target domain where the watermark is to be embedded;
LL': the pixel data stream of the mirror image corresponding to the target image, but free of high-frequency components; and
$LL_E$: the pixel data stream of a wavelet-transformed DC component domain in which the watermark has been embedded.

12. A blind digital watermark extracting apparatus based on wavelet transform comprising:
a high-frequency component removing unit for removing high-frequency components from a target image corresponding to a target domain of a wavelet-transformed original image in which watermarks are to be embedded, thereby generating a mirror image corresponding to the target domain free of high-frequency components;
an index information generating unit for generating index information representing pixel positions in the target domain where data of the watermarks are to be embedded, respectively;
a watermark generating unit for generating a data stream of the watermarks to be embedded in the target image;
a watermark extracting unit for receiving the index information from the index information generating unit, receiving a watermark-embedded image corresponding to a watermark-embedded domain of the wavelet-transformed original image, and extracting a data stream of watermarks from in the watermark-embedded image, based on the index information; and
a watermark comparing unit for checking a similarity between the original watermark data stream from the watermark generating unit and the extracted watermark data stream from the watermark extracting unit, thereby determining whether or not the original watermarks are embedded in the wavelet-transformed original image.

13. The blind digital watermark extracting apparatus based on wavelet transform according to claim 12, wherein the high-frequency component removing unit generates the mirror image by performing again a 1-level wavelet transform for the target domain of the wavelet-transformed original image, removing high-frequency components from detail domains of the wavelet-transformed target domain, except for an estimate component domain of the wavelet-transformed target domain, and performing an inverse wavelet transform for the resultant target domain.

14. The blind digital watermark extracting apparatus based on wavelet transform according to claim 12, wherein the high-frequency component removing unit removes high-frequency components from the target image by replacing, with a value of "0", values of the high-frequency components in the detail domains of the wavelet-transformed target domain.

15. The digital watermark extracting apparatus based on wavelet transform according to claim 12, wherein the index information generating unit generates, as the index information, a binary sequence data stream randomly set in accordance with an index information setting key value selected by a user while having the same size as the target domain.

16. The blind digital watermark extracting apparatus based on wavelet transform according to claim 12, wherein the target domain corresponds to a DC component domain obtained from the original image subjected to a wavelet transform at a level determined by a length and embedding strength of the watermark data stream, and the level of a degradation in picture quality caused by the embedding of the watermark data stream.

17. The blind digital watermark extracting apparatus based on wavelet transform according to claim 16, wherein the watermark data stream is random data of "1" and "−1" randomly set in accordance with a watermark data stream setting key selected by a user.

18. The blind digital watermark extracting apparatus based on wavelet transform according to claim 12, wherein the watermark extracting unit compares the pixel data value of the target image at a position where a watermark of the watermark data stream embedded in the target image is embedded, with the pixel data value of the mirror image at the same position, and outputs a watermark data value selected from two opposite values based on whether or not the pixel data value of the target image is higher than the pixel data value of the mirror image at the same position.

19. The blind digital watermark extracting apparatus based on wavelet transform according to claim 18, wherein the watermark extracting unit determines the watermark data value to be "1" when the pixel data value of the target image is higher than the pixel data value of the mirror image at the same position, while determining the watermark data value to be "−1" when the pixel data value of the target image is not higher than the pixel data value of the mirror image at the same position.

20. The blind digital watermark extracting apparatus based on wavelet transform according to claim 18, wherein the watermark comparing unit checks the similarity between the watermark data stream from the watermark generating unit and the extracted watermark data stream from the watermark extracting unit by calculating a correlation value between the watermark data streams.

21. The blind digital watermark extracting apparatus based on wavelet transform according to claim 20, wherein the watermark comparing unit calculates the correlation value between the watermark data streams using the following equation, and determines that the original watermarks are embedded in the wavelet-transformed original image when the calculated correlation value is high, while determining that the original watermarks are not embedded in the wavelet-transformed original image when the calculated correlation value is low:

$$Sim(w, w'_E) = \frac{\sum_{i=1}^{WM\_Length} w(i) \cdot w'_E(i)}{\sum_{i=1}^{WM\_Length} w'_E(i) \cdot w'_E(i)}$$

where,
WM_Length: a watermark data stream length;
w(i): the watermark data stream from the watermark generating unit; and
$w_E'(i)$: the extracted watermark data stream from the watermark extracting unit.

22. A digital watermark embedding method in a wavelet-based blind digital watermark embedding apparatus including a high frequency removing unit, an index information generating unit, a watermark generating unit, and a watermark embedding unit, comprising the steps of:
 (a) executing a multi-level wavelet transform at a level corresponding to the size of a data stream of watermarks to be embedded, for an original image in which the watermarks are to be embedded, and setting a target domain of the wavelet-transformed image in which the watermarks are to be embedded;
 (b) removing high-frequency components from a target image corresponding to the set target domain, thereby generating a mirror image corresponding to the target image, but free of high-frequency components;
 (c) generating index information representing pixel positions in the target domain where data of the watermarks are to be embedded, respectively; and
 (d) embedding the watermark data stream in pixel data of the target image at the pixel positions determined based on the index information, respectively.

23. The digital watermark embedding method according to claim 22, wherein the target domain is set, at the step (a), by a DC component domain obtained from the original image subjected to a wavelet transform at a level determined by a length and embedding strength of the watermark data stream to be embedded, and the level of a degradation in picture quality caused by the embedding of the watermark data-stream.

24. The digital watermark embedding method according to claim 22, wherein the index information is a binary sequence data stream randomly set in accordance with an index information setting key value selected by a user while having the same size as the target domain.

25. The digital watermark embedding method according to claim 22, wherein the step (d) comprises the steps of:
 (d1) checking the data value of a watermark of the watermark data stream to be embedded in the target domain at a position where the watermark is to be embedded;
 (d2) if the watermark data value corresponds to "1", then setting the data value of a pixel in the target image at the position to be higher than the data value of a pixel in the mirror image at the same position; and
 (d3) if the watermark data value corresponds to "−1", then setting the pixel data value of the target image to be lower than the pixel data value of the mirror image.

26. The digital watermark embedding method according to claim 25, wherein the step (d2) comprises the step of:
 replacing the pixel data value of the target image with the pixel data value obtained by adding a predetermined interval factor to the pixel data value of the mirror image at the same position, as expressed by the following equation, so as to maintain a desired interval between the pixel data value of the target image and the pixel data value of the mirror image, thereby embedding the watermark in the target image:

$$LL_E(idx(i))=LL'(idx(i))+\text{INTERVAL}$$

where,
 idx(i): the index information representing the position of the target domain where the watermark is to be embedded;
 LL': the pixel data stream of the mirror image corresponding to the target image, but free of high-frequency components; and
 $LL_E$: the pixel data stream of a wavelet-transformed DC component domain in which the watermark has been embedded.

27. The digital watermark embedding method according to claim 25, wherein the step (d3) comprises the step of:
 replacing the pixel data value of the target image with the pixel data value obtained by deducting a predetermined interval factor to the pixel data value of the mirror image at the same position, as expressed by the following equation, so as to maintain a desired interval between the pixel data value of the target image and the pixel data value of the mirror image, thereby embedding the watermark in the target image:

$$LL_E(idx(i))=LL'(idx(i))-\text{INTERVAL}$$

where,
 idx(i): the index information representing the position of the target domain where the watermark is to be embedded;
 LL': the pixel data stream of the mirror image corresponding to the target image, but free of high-frequency components; and
 $LL_E$: the pixel data stream of a wavelet-transformed DC component domain in which the watermark has been embedded.

28. The digital watermark embedding method according to claim 25, wherein the predetermined interval factor value is set to a maximum interval between the pixel data values of the target and mirror images capable of preventing a degradation in picture quality.

29. The digital watermark embedding method according to claim 22, wherein the watermark data stream is random data of "1" and "−1" randomly set in accordance with a watermark data stream setting key selected by a user.

30. The digital watermark embedding method according to claim 22, wherein the target domain corresponds to a DC component domain obtained from the original image subjected to a wavelet transform at a level determined by a length and embedding strength of the watermark data stream to be embedded, and the level of a degradation in picture quality caused by the embedding of the watermark data stream.

31. A digital watermark extracting method in a wavelet-based blind digital watermark extracting apparatus including a high frequency removing unit, an index information generating unit, a watermark generating unit, a watermark extracting unit, and a watermark comparing unit, comprising the steps of:
 (a') generating position information about pixels in which a data stream of original watermarks has bee embedded, based on a target image corresponding to a target domain of a wavelet-transformed original image in which the original watermark data stream has been embedded;
 (b') receiving data of pixels in the target domain in which the original watermark data stream has been embedded;
 (c') extracting a watermark data stream from the received pixel data at positions determined based on the pixel position information; and
 (d') checking a similarity between the original watermark data stream and the extracted watermark data stream, thereby determining whether or not the original watermarks are embedded in the wavelet-transformed original image.

32. The digital watermark extracting method according to claim 31, wherein the target domain is set, at the step (a'), by a DC component domain obtained from the original image subjected to a wavelet transform at a level determined by a length and embedding strength of the original watermark data stream, and the level of a degradation in picture quality caused by the embedding of the original watermark data stream.

33. The digital watermark extracting method according to claim 31, wherein the step (c') comprises the steps of:
   (c'1) comparing the pixel data value of the target image at a position where a watermark of the watermark data stream embedded in the target image is embedded, with the pixel data value of the mirror image at the same position; and
   (c'2) outputting a watermark data value selected from two opposite values based on whether or not the pixel data value of the target image is higher than the pixel data value of the mirror image at the same position.

34. The digital watermark extracting method according to claim 33, wherein the step (c') comprises the steps of:
   if the pixel data value of the target image is higher than the pixel data value of the mirror image at the same position, then outputting a value of "1" as the watermark data value; and
   if the pixel data value of the target image is not higher than the pixel data value of the mirror image at the same position, then outputting a value of "−1" as the watermark data value.

35. The blind digital watermark extracting method according to claim 31, wherein the step (d') of determining whether or not the original watermarks are embedded in the wavelet-transformed original image comprises the steps of:
   calculating a correlation value between the watermark data streams using the following equation; and
   determining that the original watermarks are embedded in the wavelet-transformed original image when the calculated correlation value is high, while determining that the original watermarks are not embedded in the wavelet-transformed original image when the calculated correlation value is low:

$$Sim(w, w'_E) = \frac{\sum_{i=1}^{WM\_Length} w(i) \cdot w'_E(i)}{\sum_{i=1}^{WM\_Length} w'_E(i) \cdot w'_E(i)}$$

where,

WM_Length: a watermark data stream length;

w(i): the original watermark data stream; and $w_E'(i)$: the extracted watermark data stream.

36. The digital watermark extracting method according to claim 31, wherein the original watermark data stream is random data of "1" and "−1" randomly set in accordance with a watermark data stream setting key selected by a user.

37. The digital watermark extracting method according to claim 31, wherein the target domain corresponds to a DC component domain obtained from the original image subjected to a wavelet transform at a level determined by a length and embedding strength of the original watermark data stream, and the level of a degradation in picture quality caused by the embedding of the original watermark data stream.

* * * * *